June 11, 1957 R. C. RUSSELL 2,795,152
TORQUE CONVERTER WITH REVERSELY ROTATABLE TURBINE MEMBER
Filed Aug. 7, 1953
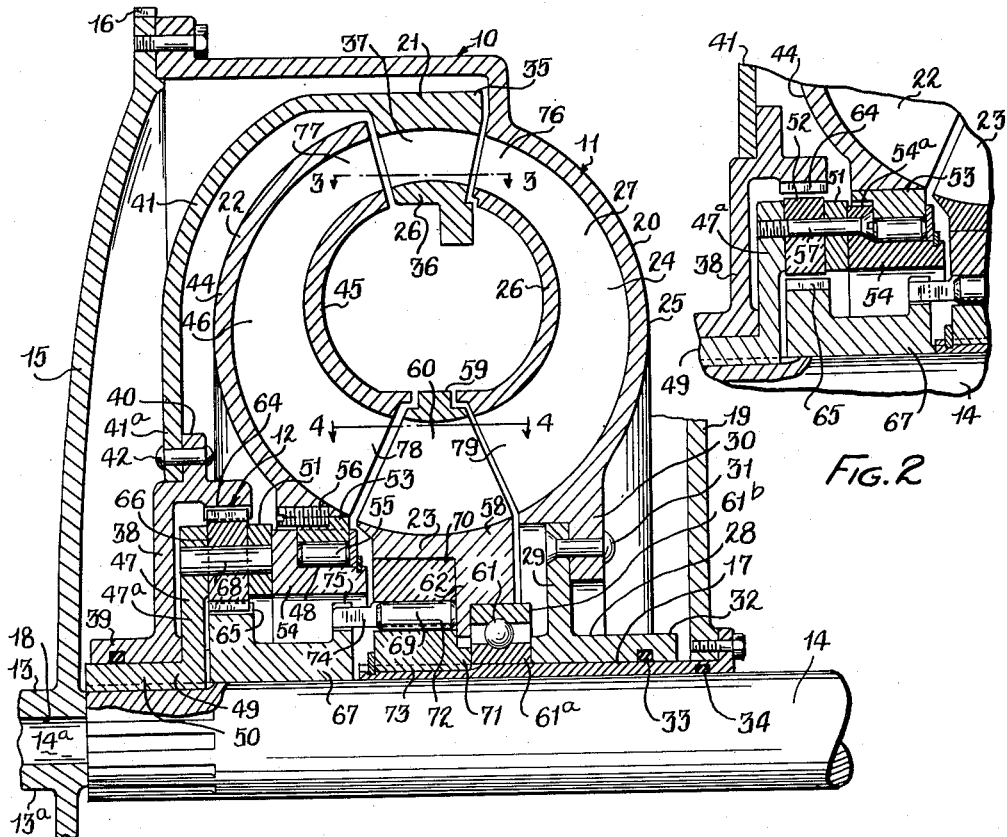
Fig. 1
Fig. 2
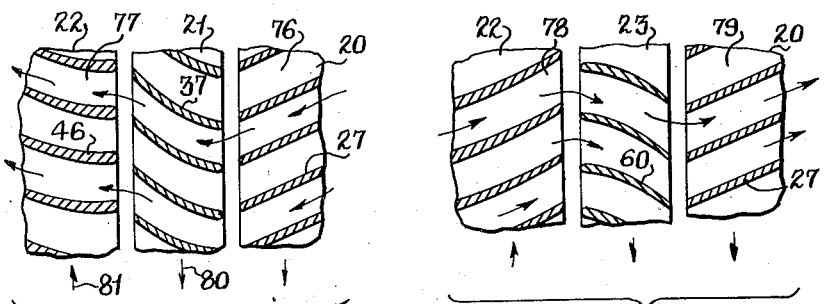
Fig. 3
Fig. 4
INVENTOR.
ROBERT C. RUSSELL
BY Hudson, Boughton,
Williams, David & Hoffmann
ATTORNEYS United States Patent Office 2,795,152
Patented June 11, 1957

2,795,152
TORQUE CONVERTER WITH REVERSELY ROTATABLE TURBINE MEMBER

Robert C. Russell, South Euclid, Ohio, assignor to Eaton Manufacturing Company, Cleveland, Ohio, a corporation of Ohio Application August 7, 1953, Serial No. 372,910

4 Claims. (Cl. 74—677)

This invention relates to power transmission mechanisms and, more particularly, to a transmission of the combined hydraulic torque converter and mechanical gear train type, in which cooperating relatively rotatable bladed annular members defining a toroidal fluid circuit include a pair of turbine members.

An object of this invention is to provide an improved transmission of this kind in which a high value and wide range of torque amplification will be obtainable and in which one of the turbine members is capable of a relatively free rotation to prevent the same from decreasing the torque output of the other turbine member.

Another object is to provide an improved transmission of the character above indicated in which the first turbine member of the toroidal fluid circuit produces a relatively high value of torque amplification, particularly for the starting or stall condition of operation, and the second turbine member functions mainly as a runner or fluid coupling member, and in which one-way clutch means associated with the second turbine member permits the latter to have a relatively free reverse rotation.

Still another object is to provide an improved transmission of the kind referred to above in which the first turbine member is connected with an output means by mechanical torque amplification gearing, preferably planetary gearing, and in which the connection of the second turbine with the output means is a substantially direct connection comprising a one-way clutch means effective to transmit torque in a forward direction to the output means and also permitting the second turbine to have a relatively free reverse rotation for preventing the latter from acting as a drag on the first turbine member.

The invention can be further briefly summarized as consisting in certain novel combinations and arrangements of parts hereinafter described and particularly set out in the claims hereof.

In the accompanying sheet of drawings, forming a part of this specification:

Fig. 1 is a partial vertical axial section taken through a transmission mechanism embodying the present invention;

Fig. 2 is a fragmentary vertical axial section further illustrating the connecting means between the second turbine member and the output means;

Fig. 3 is a fragmentary sectional view taken through adjacent portions of the pump member and the first and second turbine members, substantially as indicated by section line 3—3 of Fig. 1, and illustrating the approximate shape and angularity of the blades of these members; and Fig. 4 is a fragmentary sectional view similar to Fig. 3, but taken through adjacent portions of the pump member, reaction member and second turbine member, substantially as indicated by section line 4—4 of Fig. 1.

The improved transmission 10 comprises in general a torque amplification device or converter 11 of the toroidal fluid circuit type, and mechanical torque amplification gearing 12 associated with such torque converter. The transmission 10 also comprises a rotatable power input member or shaft 13, and a rotatable power output member or shaft 14.

The input member 13 comprises a shaft portion 13$^a$ and a disk or flywheel portion 15 connected with such shaft portion and provided around its outer periphery with gear teeth 16 adapted to be engaged by the driving pinion of a starting motor. The output shaft 14 is rotatably journalled in a fixed inner sleeve 17 and is disposed in substantially coaxial alignment with the shaft portion 13$^a$ of the input member. At its forward or inner end, the output shaft 14 is provided with a reduced portion or shaft extension 14$^a$ which is journalled in a pilot bearing 18 of the input member 13. The inner sleeve 17 is supported and held in fixed relation by having its outer end suitably secured to a stationary outer housing 19 in which the torque converter 11 is rotatable.

The torque converter 11 comprises a group of relatively rotatable bladed annular members 20, 21, 22 and 23 in cooperating relation and defining a toroidal fluid path or circuit passage 24 interiorly of this device. The member 20 of this group is an annular pump member having curved annular outer and inner walls 25 and 26 spaced apart by a portion of the fluid circuit passage 24, and an annular group of spaced blades or vanes 27 extending between and a connecting such outer and inner walls. The pump member 20 also comprises a substantially central hub member 28 having a radial annular flange 29 to which the radial flange 30 of the outer wall 25 is secured as by means of rivets 31. The hub member 28 also includes an axial sleeve portion 32 which is journalled on the fixed inner sleeve 17 for rotatably mounting the pump member 20 on this sleeve.

A packing ring 33, disposed in an internal groove of the sleeve portion 32 of the hub 28, sealingly engages the fixed sleeve 17. Similarly, a packing ring 34, disposed in an internal groove of the fixed sleeve 17, sealingly engages the output shaft 14.

The first or primary turbine member 21 comprises a pair of outer and inner annular walls 35 and 36 spaced apart by a portion of the toroidal fluid circuit passage 24, and an annular group of spaced blades or vanes 37 extending between and connecting such outer and inner walls. The first turbine member 21 also comprises a substantially central hub member 38 having an axial sleeve portion 39 and a substantially radial annular flange 40. The outer wall 35 of this turbine member includes a forwardly and inwardly curving annular web portion 41 which includes a substantially flat central plate portion 41$^a$ and is secured to the hub member 38, as by means of rivets 42 extending through such plate portion and through the radial flange 40.

The second turbine member 22 comprises curved outer and inner annular walls 44 and 45 which are spaced apart by a portion of the fluid circuit passage 24, and an annular group of spaced blades or vanes 46 extending between and connecting such outer and inner walls. The turbine member 22 is connected with the output shaft 14 by connecting means which includes a planetary carrier 47 and a one-way clutch device 48. The carrier 47 comprises an axial sleeve portion 49 which is fixed on the output shaft 14 by the splined connection 50 and a radial flange portion 47$^a$. The carrier 47 also includes a cover ring 51 and a spacer ring 52 disposed between such radial flange and cover ring.

The one-way clutch device 48 comprises a pair of clutch rings 53 and 54 and an annular group of circumferentially spaced clutch rollers 55 disposed between these clutch rings. The outer wall 44 of the turbine member 22 is mounted on and connected with the clutch ring 53 by circumferentially spaced locking screws 56. The clutch ring 54 is connected with and carried by the radial flange 47ª of the carrier 47 by circumferentially spaced axially extending screws 57. As shown in Fig. 2, the screws 57 extend through a radial flange portion 54ª of the clutch ring 54 and also extend through the cover ring 51 and the spacer ring 52 with a threaded portion of such screws engaged in threaded openings of the flange 47ª.

The reaction member 23 comprises a pair of outer and inner annular walls 58 and 59 which are spaced apart by a portion of the fluid circuit passage 24, and an annular group of spaced blades or vanes 60 extending between and connecting such outer and inner walls. The reaction member 23 is rotatably supported on the fixed inner sleeve 17 by an antifriction bearing 61 whose inner race 61ª surrounds the fixed sleeve and whose outer race 61ᵇ is engaged by a substantially radial annular flange 62 of the outer wall 58.

The first turbine member 21 is drivingly connected with the output shaft 14 by the mechanical gearing 12 which is here shown as being planetary gearing comprising ring and sun gears 64 and 65, and planet pinion gears 66 disposed between and in meshing engagement with such ring and sun gears. The ring gear 64 is connected with, or formed by, a portion of the hub 38 of the first turbine 21. The sun gear 65 is carried by a sleeve 67 which is rotatably journalled on the output shaft 14 at a point between the fixed inner sleeve 17 and the splined sleeve 49.

The planet pinion gears 66 constitute a group of circumferentially spaced gears, for example three such gears, located in gaps or interruptions of the spacer ring 52 and rotatably supported by axially extending pinion shafts 68. These pinion shafts extend into and connect the cover ring 51 with the flange 47ª of the carrier 47.

From the construction of the torque converter 11, as thus far described, it will be seen that the second turbine member 22 is substantially direct-connected with the output shaft 14 through the carrier means for the planet pinions 66 and through the clutch device 48. It is an important feature of this invention that the clutch device 48 is a one-way clutch means, as mentioned above, which renders the connecting means for the turbine member 22 effective for transmitting torque in a forward driving direction to the output shaft 14, and which clutch means permits this second turbine member to, at times, have a relatively free reverse rotary movement which will be further described hereinafter.

The reaction member 23 and the sun gear 65 are inhibited against reverse rotation by one-way brake means, which is here shown as comprising a single one-way brake device 69 which serves both the reaction member and the sun gear. In the embodiment of the invention herein disclosed the reaction member 23 and the sun gear 65 are held against reverse rotation by the same one-way brake device 69.

The one-way brake device 69 comprises rings 70 and 71 and an annular group of rollers 72 disposed between such rings. The ring 70 is connected with the outer wall 58 of the reaction member 23 and the ring 71 is connected with the fixed sleeve 17 by the splined connection 73. The one-way brake device 69 is effective for holding the sun gear 65 against reverse rotation by means of axial fingers 74 carried by the ring 70 and extending into meshing engagement with radial teeth or lugs 75 provided on the sleeve 67.

The rotatable annular pump, turbine and reaction members 20, 21, 22 and 23 are disposed in a series relation in the toroidal fluid circuit 24 with the first turbine member 21 located between the discharge portion 76 of the pump member and the inlet portion 77 of the second turbine member 22, and with the reaction member 23 located between the discharge portion 78 of the second turbine member and the inlet portion 79 of the pump member 20. Rotation of the pump member in a forward direction by the input shaft 13 causes a velocity stream of hydraulic fluid to be delivered through the discharge portion 76 into the first turbine member 21, from which it passes into and through the second turbine member 22. Upon leaving the second turbine member, the fluid stream passes through the reaction member 23 and return to the pump member 20 through the inlet portion 79 of the latter.

During the starting or stall condition of operation of the transmission 10, the velocity fluid stream delivered by the pump member 20 will be immediately effective on the first turbine member 21 and will rotate the same at a progressively increasing speed such that this turbine member will be effective through the planetary gearing 12 to deliver a high value of torque to the output shaft 14. This stall condition of operation is represented in the diagrammatic views of Figs. 3 and 4 from which it will be seen that the impingement of the velocity fluid stream against the blades 37 of the first turbine 21 will rotate the same in a forward direction as indicated by the arrow 80, but the action of the fluid stream against the rear or convex faces of the blades 46 of the second turbine 22 at this time will rotate the second turbine in a reverse direction as indicated by the arrow 81. This reverse rotation of the second turbine is a relatively free rotation permitted by the one-way clutch device 48 and prevents the second turbine from acting as a drag on the first turbine.

As the speed of the first turbine 21 increases, the direction of the fluid stream leaving this turbine will change, due to the increased value of the forward component of rotary movement which the stream will then have, and will be such as to impinge against the front or concave faces of the blades 46 and will then cause the second turbine 22 to rotate in a forward direction. The speed of the second turbine will continue to increase until it rotates at approximately the speed of the pump member 20 at which time it delivers torque to the output shaft 14 as a runner or fluid coupling member. When this condition is reached, the first turbine 21 and the reaction member 23 will also be rotating in a forward direction at approximately the speed of the pump member 20 inasmuch as the reaction member, the sun and planet gears, and the first and second turbines will then all be in a so-called "locked-up" condition. From the foregoing explanation it will thus be seen that during the stall condition when the first turbine 21 delivers its maximum torque output, the speed differential between the first turbine and the pump member 20 is a relatively high value, and that subsequently when the speed differential between the first turbine and the pump member is at a low or minimum value, the second turbine 22 will be operating as a runner or coupling member and will be delivering its maximum torque output.

The gearing 12 will usually have a torque amplification ratio of approximately 1.6 to 1. The effect of the reaction member 23 will usually be such that at the stall condition of operation it will cause the torque being developed by the turbine 21 to be further amplified at approximately a 2 to 1 ratio. Therefore, the overall torque amplification achieved during the stall condition of operation will be at approximately a 2 x 1.6=3.2 amplification ratio. However, by the time the speed of the second turbine 22 has increased to the point where this turbine operates as a runner or fluid coupling member, the torque amplifying action of the gearing 12 will have disappeared and the torque delivery from the first turbine 21 will have dropped to approximately zero. Similarly the reaction or torque amplifying effect of the reaction member 23 on the turbines 21 and 22 will decrease from a high value at the stall condition to substantially a zero value when the condition is reached where the second turbine is acting only as a runner or coupling member. During the latter condition, the reaction member rotates freely in a forward direction at substantially the same speed as the pump and turbine members. The delivery of torque from the pump member 20 to the output shaft 14 while the second turbine 22 is acting as a runner member will be at approximately a 1 to 1 ratio.

From the accompanying drawing and the foregoing detailed description it will now be understood that this invention provides a transmission mechanism in which a wide range of torque amplification is obtainable as well as a desired high value of torque amplification during the starting or stall condition of operation. It will now also be seen that this invention provides such an improved transmission having a pair of turbine members and in which the second turbine member or fluid coupling member is, at times, capable of a relatively free reverse rotation so as not to impose a drag on the first turbine member.

Having thus described my invention, I claim:

1. In a power transmission mechanism; a plurality of relatively rotatable bladed annular members defining a toroidal fluid circuit and comprising a pump member, first and second turbine members and a reaction member in a series relation in said fluid circuit with said direction member inhibited against reverse rotation; rotatable power input means connected with said pump member; a rotatable output shaft; a planetary gear set comprising a ring gear connected with said first turbine member, a sun gear inhibited against reverse rotation and planet pinion means disposed between and having meshed engagement with said ring and sun gears; rotatable carrier means supporting said pinion means and having a direct-drive connection with said output shaft; and a one-way clutch automatically effective as a direct forward drive connection between said second turbine member and said output shaft; said one-way clutch being also automatically effective to release the connection of said second turbine member with said output shaft for relatively free reverse rotation of said second turbine member.

2. A transmission as defined in claim 1 in which said one-way clutch is located between said second turbine member and said carrier means.

3. A transmission as defined in claim 1 in which said one-way clutch is located between said second turbine member and said carrier means; and in which a single one-way brake is effective on said reaction member and said sun gear for inhibiting the reverse rotation thereof.

4. A transmission as defined in claim 1 in which the blades of said first and second turbine members are so disposed that a stream of velocity fluid being delivered through said circuit by said pump means during a stall condition of operation of the transmission will produce forward rotation of said first turbine member and a reverse rotation of said second turbine member; the automatic release of said second turbine member from said output shaft by said one-way clutch during said stall condition preventing said second turbine member from being a drag on said output shaft and first turbine member.

References Cited in the file of this patent

UNITED STATES PATENTS

| | | |
|---|---|---|
| 2,203,177 | Patterson | June 4, 1940 |
| 2,346,365 | Duffield | Apr. 11, 1944 |
| 2,602,353 | Keller | July 8, 1952 |
| 2,616,309 | Russell | Nov. 4, 1952 |

FOREIGN PATENTS

| | | |
|---|---|---|
| 666,092 | Great Britain | Feb. 6, 1952 |